Feb. 7, 1928.
L. A. WATTERS ET AL
1,658,363
ACCOUNTING APPARATUS
Filed June 21, 1920
8 Sheets-Sheet 1
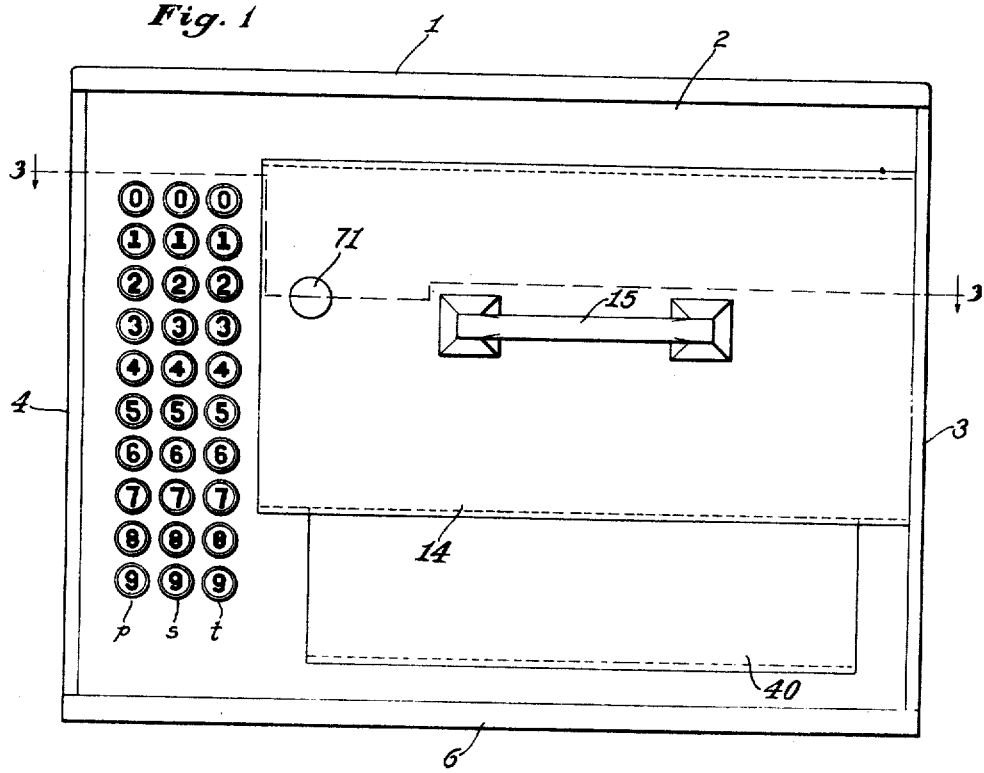
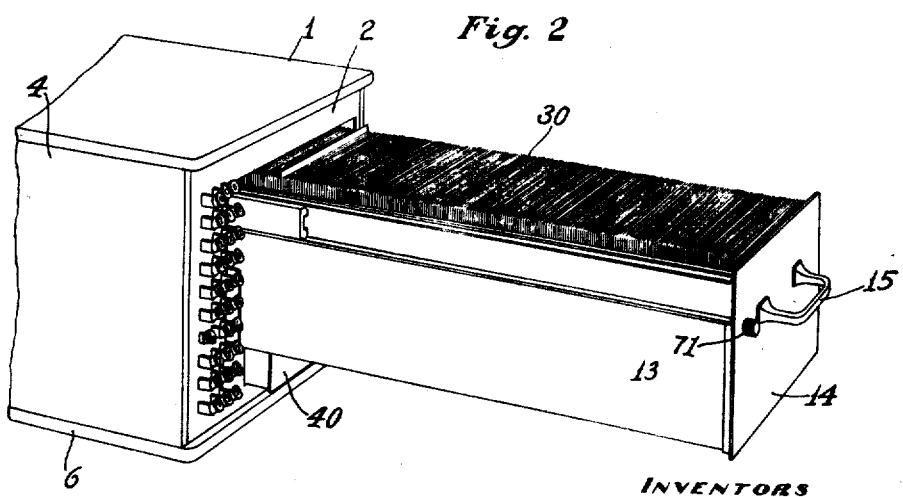
INVENTORS
LUTHER A. WATTERS AND EDWIN L. RELLER,
BY John H. Bruninga
THEIR ATTORNEY.

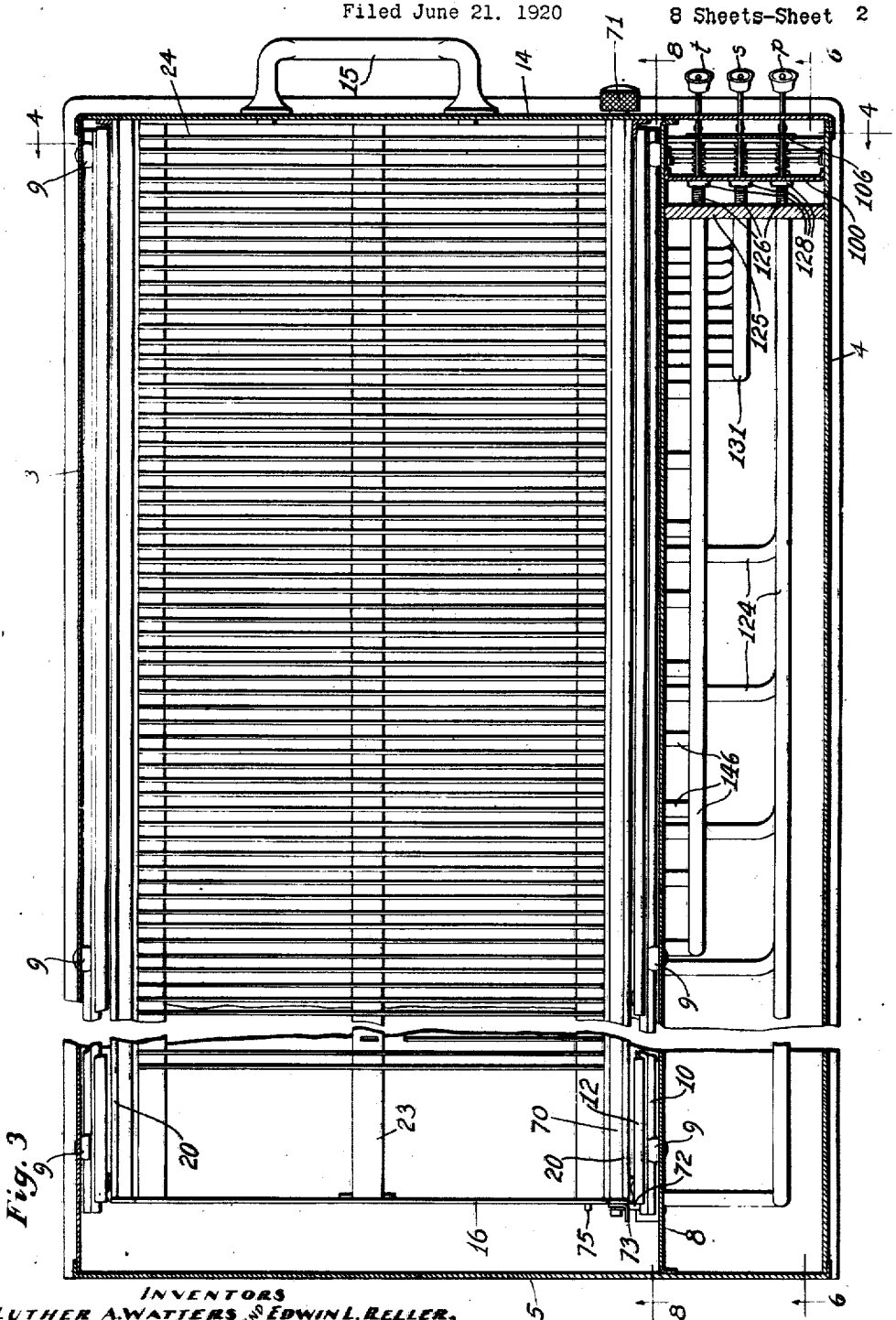

Feb. 7, 1928.

L. A. WATTERS ET AL 1,658,363

ACCOUNTING APPARATUS

Filed June 21, 1920

INVENTORS
LUTHER A. WATTERS AND EDWIN L. RELLER,
BY John H. Bruninga
THEIR ATTORNEY.

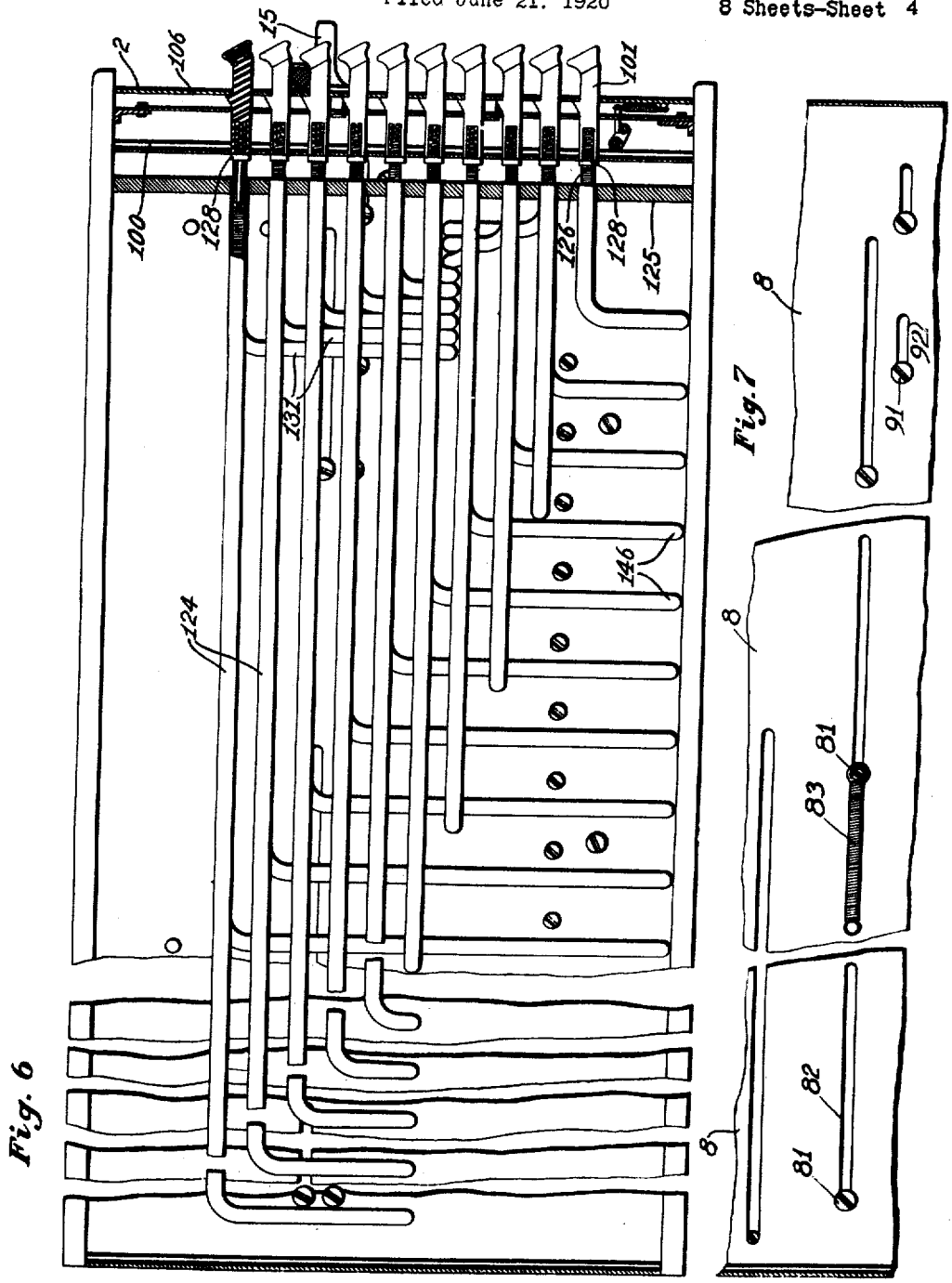

Feb. 7, 1928.
L. A. WATTERS ET AL
1,658,363
ACCOUNTING APPARATUS
Filed June 21, 1920
8 Sheets-Sheet 5
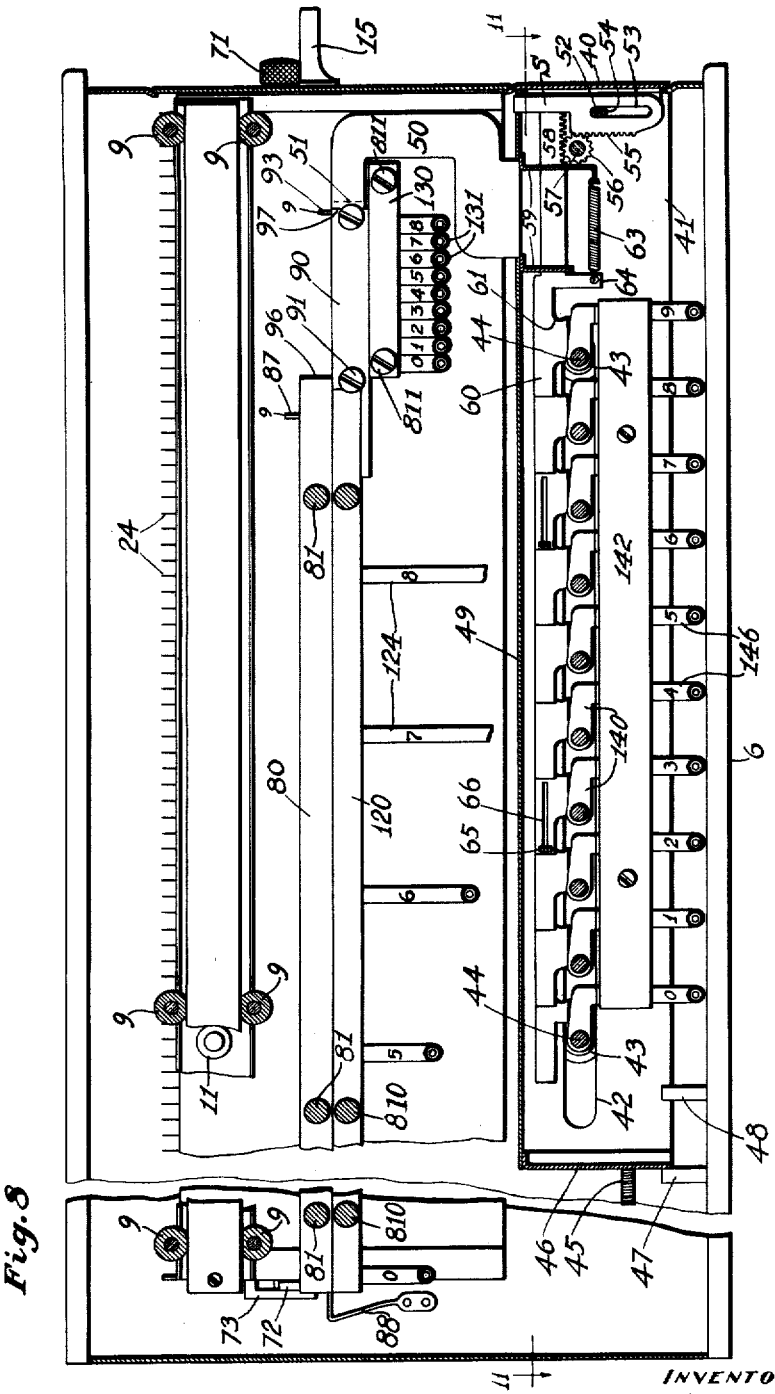
INVENTORS
LUTHER A. WATTERS AND EDWIN L. RELLER,
BY John N. Bruninga
THEIR ATTORNEY.

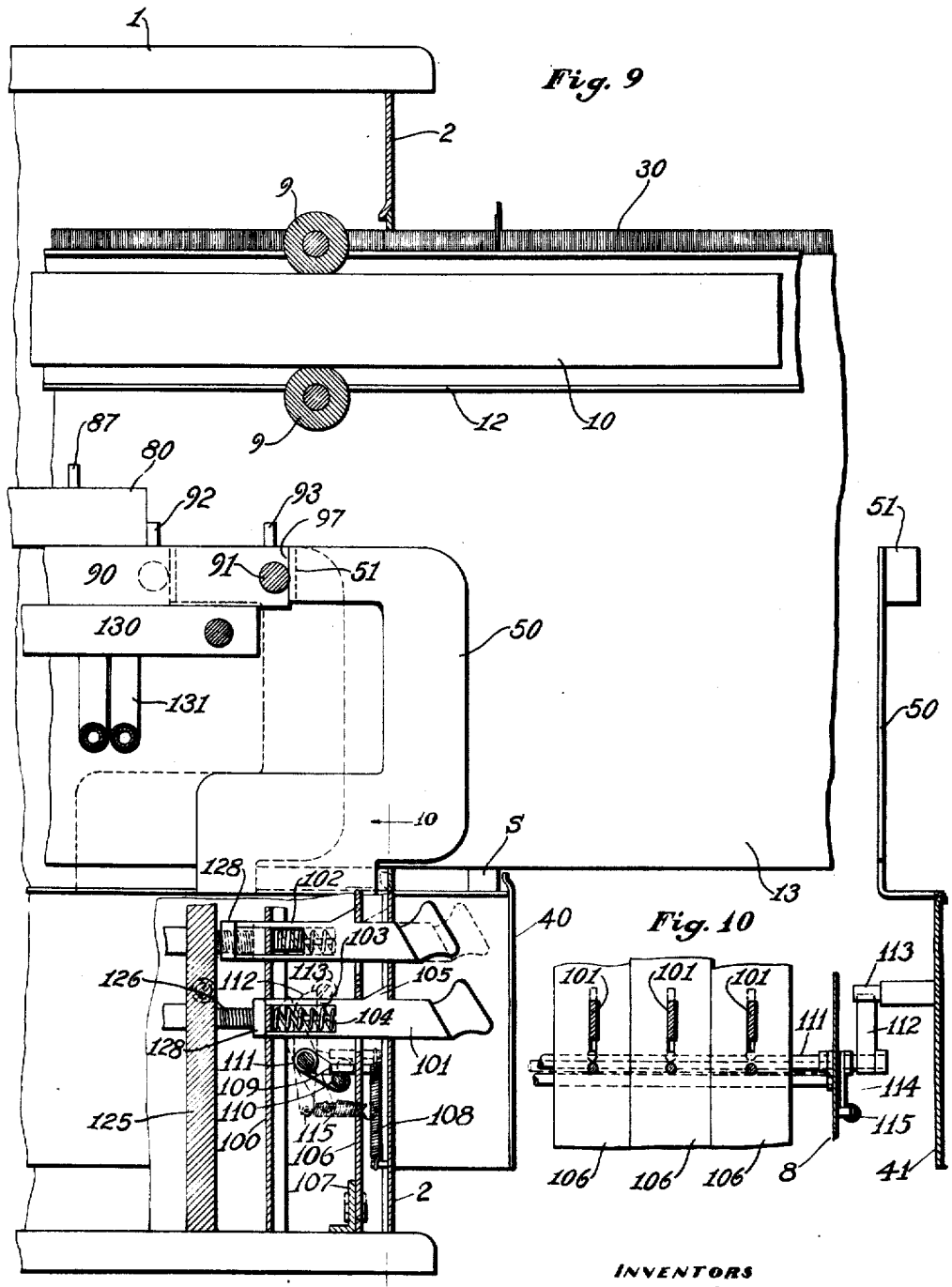

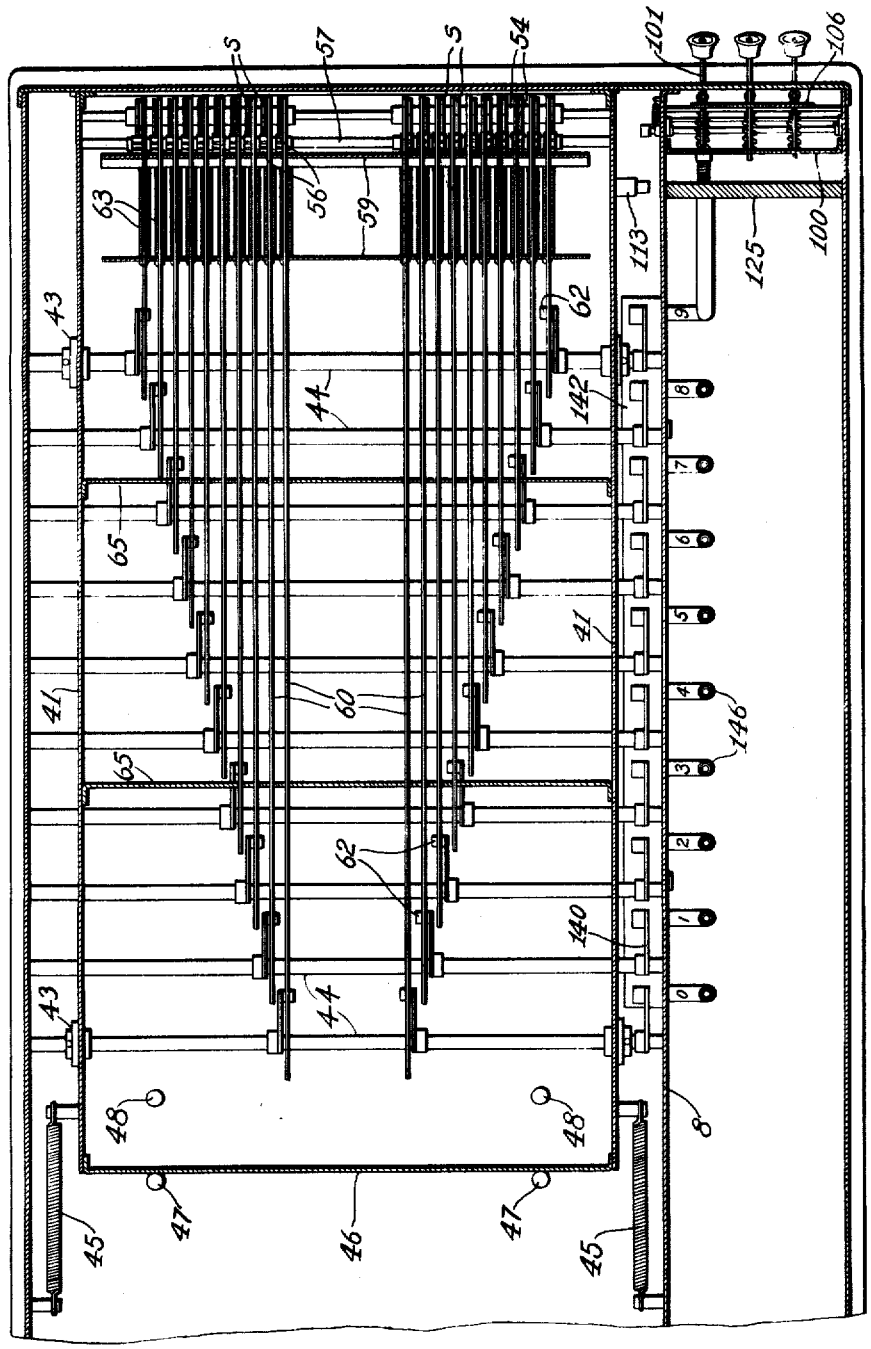

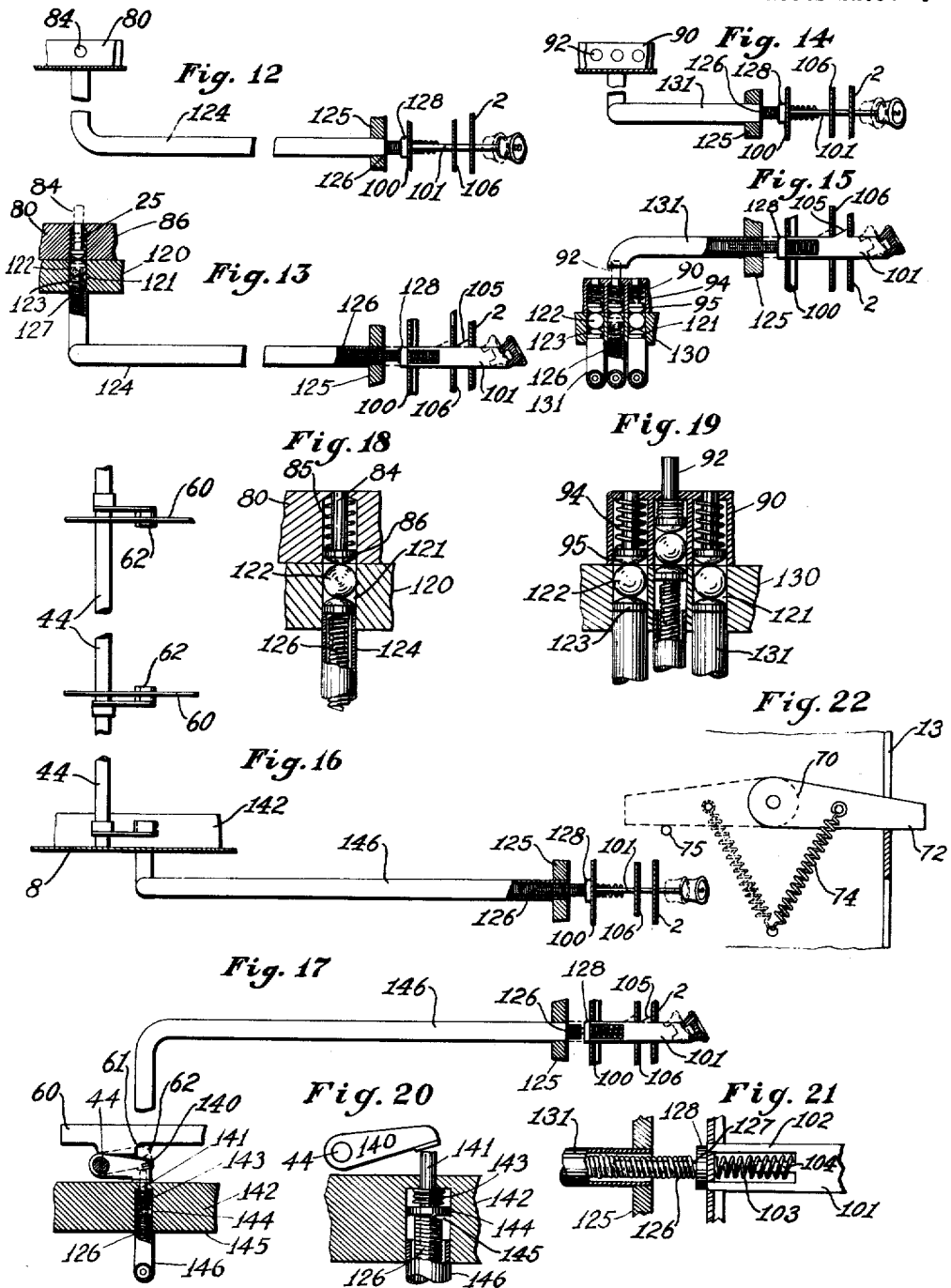

Patented Feb. 7, 1928.

1,658,363

UNITED STATES PATENT OFFICE.

LUTHER A. WATTERS AND EDWIN L. RELLER, OF ST. LOUIS, MISSOURI, ASSIGNORS, BY MESNE ASSIGNMENTS, TO REMINGTON RAND INC., OF TONAWANDA, NEW YORK, A CORPORATION OF DELAWARE.

ACCOUNTING APPARATUS.

Application filed June 21, 1920. Serial No. 390,432.

This invention relates to account finding machines and systems, and more particularly to machines of the type described in application of Watters and Lloyd Serial Number 229,996, filed April 26, 1918.

In the machine described in the application aforesaid, the desired account is found by a series of steps comprising primary, secondary and tertiary operations in accordance with a given system of classification, such as the numerical or decimal system. Accordingly, the account cards are arranged in a tray or trays, and each tray is divided by a series of partitions into a series of compartments (such as one hundred compartments for the decimal system in a tray containing one thousand cards). Accordingly in a tray containing one thousand cards, the whole may be said to be divided into ten groups of one hundred cards, and each group into ten divisions or units of ten cards each. This arranges the cards in the tray in accordance with a given system of classification. In order to effect selection of a given account by the successive operations of selective manipulative elements or keys, the selectors employed are primarily located to locate a group, secondarily located to locate a division, and tertiarily located to locate the desired card in the located division. The selectors are then operated to isolate the finally located card.

The cards of a unit or division have selective characteristics variantly arranged along the edges thereof, such as the bottom edges, so as to permit cooperation therewith of the selectors in order to effect location and selection of an individually desired card in the located unit or division.

It is frequently desirable in certain classes of files to arrange the trays in the forms of drawers, which are mounted in a support or cabinet, so as to permit the withdrawal of the drawer from the cabinet in order to expose and permit selection of a desired account.

One of the objects of this invention, therefore, is to provide an apparatus of the character described in which the card tray is mounted for movement on the support or the cabinet, together with mechanism adapted to effect selection of the cards in a tray.

Another object is to provide an apparatus of the character described in which the selection of the cards is effected upon movement or withdrawal of the tray.

Another object is to provide an apparatus of the character described in which the selecting mechanism is set through suitable selective manipulative elements, such as keys, so as to place this mechanism in condition for the selection of a desired account, and upon movement of the tray this selecting mechanism operates to select the desired account.

Another object is to provide an apparatus of the character described, in which the selecting mechanism is mounted on the support or cabinet, while the tray moves relative to such mechanism and effects the location of the mechanism opposite the desired account in order to effect selection of such account.

Another object is to provide an apparatus of the character described in which the tray is arranged to be removed from the support or cabinet on which the selecting mechanism is mounted, so as to permit replacement of another tray.

Another object is to provide an apparatus of the character described of improved construction characterized by simplicity of construction and operation.

Further objects will appear from the detail description taken in connection with the accompanying drawings, in which:

Figure 1 is a front elevation of a machine embodying this invention;

Figure 2 is a perspective view showing the tray or drawer retracted and a desired account selected or isolated;

Figure 3 is a section on the line 3—3, Figure 1;

Figure 6 is a section on the lines 6—6, Figures 3 and 4;

Figure 7 is a detail showing the mounting of the carriers;

Figure 8 is a section on the lines 8—8, Figures 3 and 4;

Figure 9 is a view similar to Figure 8, but showing the keys and with the drawer extended from the cabinet;

Figure 10 is a section on the line 10—10, Figure 9;

Figure 11 is a section on the line 11—11, Figure 4;

Figure 12 is a detail plan view showing one of the primary keys and its connected mechanism;

Figure 13 is a side elevation of Figure 12, partly in section;

Figure 14 is a view similar to Figure 12, but showing the secondary key and its connection;

Figure 15 is a side elevation of Figure 14, partly in section;

Figure 16 is a plan similar to Figure 12 showing the tertiary key and its connection;

Figure 17 is a side elevation of Figure 16, partly in section;

Figure 18 is an enlarged detail of Figure 13;

Figure 19 is an enlarged detail of Figure 15;

Figure 20 is an enlarged detail of Figure 17;

Figure 21 is an enlarged detail of Figures 13, 15 and 17; and

Figure 22 is a detail of Figure 3, showing the stop on the rod carried by a tray.

Figure 4:
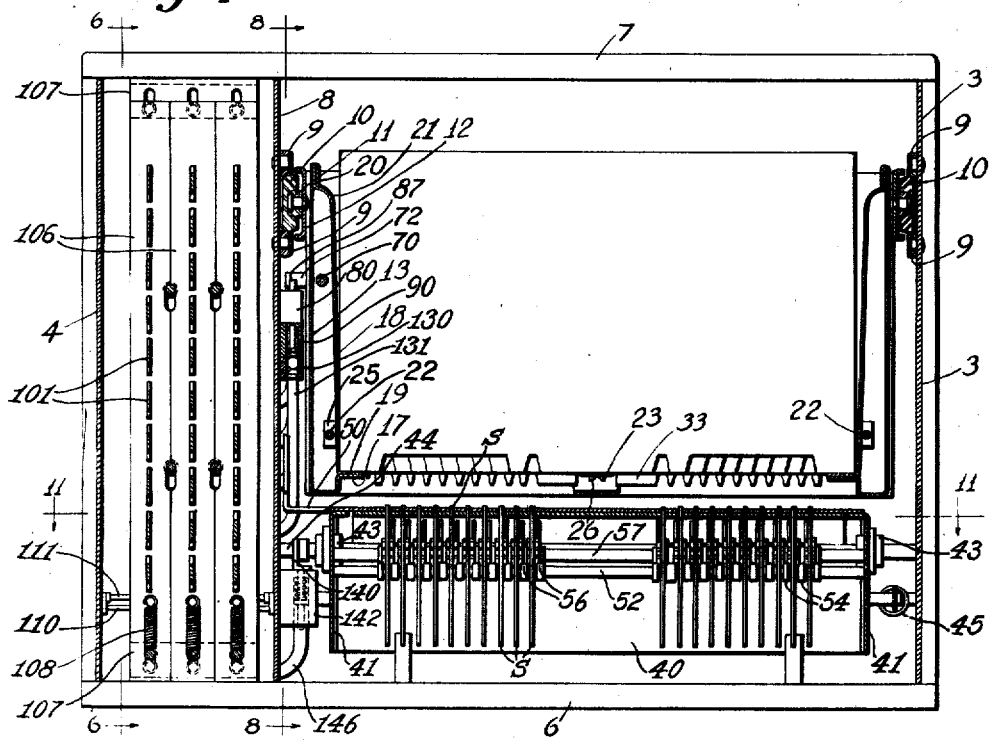
Figure 4 is a section on the line 4—4, Figure 3.

In most of the views, parts have been omitted; this has been done to permit clearness, for if all of the parts behind a plane at which a view is taken were shown, they would obscure the particular mechanism under consideration.

In the specification and claims, the term "card" is used in its broadest sense, so as to cover ordinary loose leaves, cards, sheets and other accounting elements. Similarly, the word "tray" is used in its broadest sense so as to include the various forms of holding means adaptable for the holding, retaining or segregation of accounts.

*The cabinet and tray.*

Referring to the accompanying drawings and more particularly to Figures 1 to 4 inclusive, 1 designates a support in the form of a cabinet, which may be made of metal or wood and which comprises a front 2 and sides 3 and 4, all of which may be made of metal. There is also provided a bottom 6 and a top 7 which may be of wood or metal. Arranged longitudinally of and inside of the cabinet is a partition plate 8 of metal which is secured to the front and back.

Mounted on each of the plates 3 and 8 are rolls 9 which support therebetween rails 10, it being understood that there are a series of sets of rolls arranged along the plates 3 and 8 so as to permit the rails 10 to slide therein. These rails are grooved to receive rolls 11 mounted on side bars 12 attached to and arranged along the tray or drawer at its upper end, these side bars being flanged to take over the rails, and the rails being arranged to slide along the frame, while the side bars are arranged to slide along the rails as is usual in these cabinet constructions.

The tray comprises sides 13 to the upper sides of which are connected side bars 12, a front 14, provided with a handle or pull 15, and a back 16. The sides 13 are bent upwardly and inwardly as shown at 17. Spaced from the sides 13 are side plates 18 which are bent inwardly as shown at 19 to lie on the inwardly bent portion 17 of side plates 18. These side plates 18 flare upwardly and outwardly and terminate in flanges 20 which are secured by turning over the sides 13, the upper ends of the side plates 18 being curved as shown at 21. The entire tray is additionally braced by longitudinal rods 22 and by a strip 23 connecting the front and back of the tray, the strip 23 extending longitudinally of and centrally of the tray for a purpose to be hereinafter described.

The tray is provided with a series of transverse partitions 24 of metal which have ears 25 passing through slots in the side plates 18 near the lower ends of the tray and which may be secured by the rods 22. Each partition further has lugs 26 taking into slots in the strip 23, the lugs being peened over. Accordingly, the partitions are firmly secured at their lower ends but so as to permit free flexing along the tray at their upper ends. Where a tray is to receive one thousand cards, it is divided by the partitions and the front and back into one hundred compartments, each of which is adapted to receive ten cards.

*The cards.*

Figure 5:
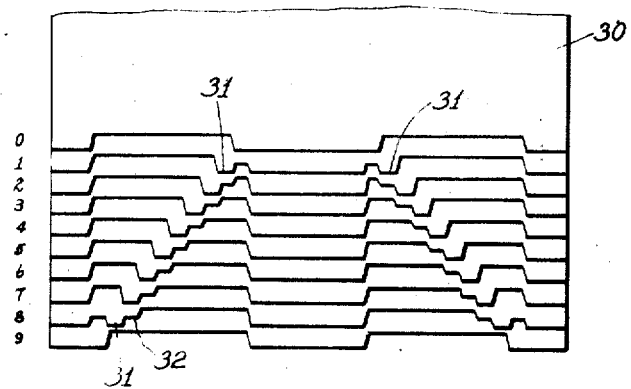
Figure 5 is a detail of a unit of cards.

The cards employed are fully described in the application referred to, together with the application of Walter Bruhn, Serial Number 352,602, filed December 26, 1919. A unit of ten cards in one compartment corresponds to the unit of cards in each and every other compartment of the tray. Accordingly, a unit comprises ten cards 30, (Figures 4 and 5) each of which is provided with a pair of main characteristics 31 and a pair of supplemental characteristics 32. The main characteristics are arranged along the bottoms of the cards in positions corresponding to the positions of the cards in the unit, while the supplemental characteristics are arranged along the bottoms of the cards to correspond to the positions of the main characteristics on the next preceding cards. It will be noted that the bottom of the tray is open, except that the flanges 19 and the strip 23 provide ledges for supporting the cards, leaving, however, the bottom otherwise open for cooperation with the characteristics of the selectors S. At the bottom of each partition is provided a comb-structure strip 33 which provides guides arranged to direct the selectors into engagement with the characteristics as fully described in the application of Watters, Lloyd and Reller, Serial Number 352,601, filed December 26, 1919.

With this construction, the operation of any selected pair of selectors S will cause by their engagement with the characteristics thereabove the elevation of the cards bearing the main characteristic and the corresponding supplementary characteristic while all of the other cards in the unit will be left undisturbed; except that the card bearing the main characteristic is raised to full height while the next succeeding card bearing the supplemental characteristic is elevated only partially.

It will, therefore, be seen that the tray carrying, for instance, one thousand cards, is arranged to be moved or withdrawn from the cabinet to any desired position, in order to position for inspection and for selection as will hereinafter be described, any desired card in any desired unit.

The selected carrier.

Referring to Figures 1, 2, 3, 4, 8, 9, and 11, mounted for longitudinal movement in the cabinet is a carrier 40 which has sides 41 provided with slots 42 taking over rollers 43 on shafts 44 mounted in the side plates 3 and 8. This carrier is normally held in retracted position by springs 45 connecting the sides 41 with the side plates 3 and 8, the inward movement being limited by the engagement of the back 46 of the carrier with a stop 47 on the base 6, while the outward movement of the carrier is limited by the engagement of the back 46 with another stop 48 also mounted on the base 6. The carrier is provided with a top 49, while the bottom is open, and to this top is attached a bracket 50, provided with an outwardly extending wing 51 in the path of an actuator movable by the tray as will hereinafter be more fully described.

The selectors.

Mounted in the front of the carrier are a series of selectors S, which are guided by slots in the top 49 and by a cross bar 52 extending across the carrier and mounted in the sides 41, the selectors being slotted at 53 to permit vertical movement thereof and these selectors being retained in spaced relation on the cross bar 52 by washers or spacers 54. In this embodiment, the selectors are arranged in two groups of ten selectors each, and corresponding selectors in the two groups are connected for concurrent elevation in a manner hereinafter to be described, in order to cause concurrent engagement with a pair of characteristics on a given card. It will be noted that these selectors are arranged across the tray, so that when any compartment is placed over these selectors, a selected pair will upon elevation enter such compartment and will be guided by the combs 33 into proper cooperative engagement with the characteristics of the corresponding desired card.

The selector actuators.

Referring to Figures 4, 8, 9 and 11, each selector S is provided with a rack 55 meshing with a pinion 56 on a cross bar 57 connecting the sides 41, and each pinion meshes with a corresponding rack 58 guided by slots in brackets 59 depending from the top 49. It will be understood that the pinions 56 are properly spaced by spacers in order to hold them in proper cooperative relation with respect to the racks 55 and 58.

Each rack 58 has an extension 60 provided with a hook 61 adapted to engage with a laterally extending lug 62 on an arm carried by a cross shaft 44, but the rack is normally held in the position shown in Figure 8 by a spring 63 connecting a lug 64 on the rack with one of the brackets 59, the movement being limited by the engagement of the lug with the other bracket 59. When the lug 62 on the shaft 44 is raised, it will take in front of the hook 61 on the rack 58. Accordingly if the carrier is moved outwardly or to the right, Figure 8, the lug 62 mounted on the shaft 44 fixed to the frame will hold the rack 58 against movement. Accordingly, the pinion 56 will roll on the rack 58 thereby causing elevation of the selector geared to the pinion. When, however, the carrier is again returned by the springs 45, the spring 63 will prevent rearward movement of the rack with the carrier and accordingly will then cause the selector, which has been elevated, to again drop.

It will, however, be understood that only the selector whose rack has been retained against movement will be elevated.

Upon referring to Figures 8 and 11, it will be seen that there are ten pairs of racks 58 and extensions 60 corresponding to the ten pairs of selectors and that the rack extensions increase in length towards the median line of the machine. Furthermore, there are ten shafts 44 corresponding to the ten pairs of selectors and rack extensions and each shaft 44 carries a pair of lugs 62. Accordingly upon movement of any shaft 44, a pair of corresponding extensions and racks are retained against movement so that upon forward movement of the carrier, a pair of corresponding selectors will be elevated. It will be understood, of course, that normally the lugs 62 are in depressed position so that all selectors are normally inactive and that only those selectors will be rendered active whose extensions are retained.

All of the ten shafts 44 are mounted for rotation in the side plates 3 and 8 and all of these shafts pass through the slots 42 in the sides 41 of the carrier, but only two of these shafts have the guide rollers 43 for the carrier 40 thereon. In order to additionally guide and brace the lower extensions 60, there are provided cross bars 65 connecting the sides 41 of the carrier at intervals, and such cross bars are slotted to receive slots 66 in the extensions.

It will, therefore, be seen that upon actuation of any selected shaft 44, a pair of selectors will be rendered effective for actuation upon forward movement of the selector carrier 40 and that these selectors are automatically returned upon returning the carrier to normal position.

There is in this embodiment a separate selector for each characteristic or position of a card in a unit and these selectors are duplicated on opposite sides of the median line of the tray, whereby a chosen card will be elevated by a pair of selectors at spaced points along its length so as to prevent tipping of a wide card.

Tray locating mechanism.

In accordance with this invention the selectors are arranged on the support or cabinet underneath and in a line across the tray so that the selectors are arranged to locate in a unit or compartment. The tray is mounted for movement into and out of the cabinet over these selectors so that any desired compartment or unit may be located over the selectors. Now in order to adapt the machine to a given system of classification, such as the numerical system, it is necessary that the locations be successive primary and secondary locations in accordance with the orders of the system of classification. Accordingly, the primary location must be of a group (for instance, of ten compartments comprising one hundred cards), while the secondary location must be of a division or unit (for instance, comprising ten cards). The tertiary location is obtained by the location and selection of the selectors. In accordance with the illustrated embodiment of this invention, the tray is provided with a tappet, while the cabinet is provided with cooperating stops arranged to arrest the tray in selected positions. In order to cause location in accordance with the orders of the system of classification, such, for instance, as the numerical or decimal system, there are provided a series of primary stops corresponding to the primary order, and working in conjunction with the primary stops are a series of secondary stops corresponding to the secondary order of the system.

Referring to Figures 3, 8 and 22, the rod 70 is arranged along the inner side of the tray near its top and has bearings in the front 2 and back 16 of the tray. This rod has fixed at the front end thereof a knob 71, while the rear end has fixed thereto a tappet 72 arranged to project through a slot in a bracket 73 attached to the back 16. A spring 74 connecting the tappet with the tray back is arranged to hold the tappet projected beyond the inner side wall 13 of the tray, but upon turning of the knob 71, the tappet is arranged to be moved in the direction of the arrow so as to not project beyond the side wall, and the spring 74 will then hold the tappet 72 against a stop 75 on the back 16. Accordingly by turning of the knob 71, the tappet 72 can be withdrawn so as to permit the tray to be completely removed from the cabinet and another tray inserted.

Primary locating means.

Referring to Figures 3, 4, 6, 7, 9, 13, and 18, the side plate 8 has slidably mounted thereon and extending therealong the primary carrier 80, which is guided for movement by studs 81 engaging slots 82 in the side plate. The carrier is held in normal position by a spring 83 anchored on the plate 8 and connected with one of the studs 81, the rearward movement of the carrier being limited by the engagement of the studs with the rear ends of the slots 82. The top of this carrier is immediately below the bottom face of the tappet 72 so that the tappet is arranged to slide along the carrier. The carrier is provided with a series of ten stops, the first nine of which are indicated at 84 and are normally held in retracted position with their upper ends flush with or wholly below the upper surface of the carrier 80, by springs 85 bearing against heads 86 on these movable stops, while the tenth stop 87 is fixed to the carrier. These ten stops correspond to the ten primary locations of the tray and each stop comprehends ten compartments or units of the tray. Accordingly, for instance, if the "8" stop 84 is projected into the path of the tappet 72, the tray can move freely until the first compartment in the "80" group is located when the tappet will engage this "8" stop. Upon further movement of the tray, the carrier 80 will then travel with the tray against the tension of the spring 83 for a limited movement as will be hereinafter described.

Secondary locating means.

Referring to Figures 3, 4, 6, 7, 8, 9, 15 and 19, mounted for sliding movement upon and along the plate 8 is a secondary carrier 90 which is also guided for movement by studs 91 engaging slots in the plate. This carrier 90 is arranged with its upper face immediately below the lower face of the carrier 80 so that the carrier 80 is arranged to slide over the carrier 90.

The carrier 90 is also provided with a series of ten stops, nine of which indicated at 92, have their tips normally flush with or slightly below the upper face of the carrier 90, while the tenth stop 93 is fixed to the carrier 90. The stops 92 are normally retained in retracted position by springs 94 engaging heads 95 on the stops. The stops 92 and 93 are in the path of the end 96 of the carrier 80, which end acts as a tappet, while the end 97 of the carrier 90 is in the path of the wing 51 on the bracket 50 attached to the selector carrier 40, the end 97 also acting as a tappet.

The stops 92 and 93 are spaced apart distances corresponding to the spacings of the compartments or units in the tray and accordingly the ten stops correspond to the ten units or divisions in each and every group comprehended by the primary stops 84 and 87. Accordingly, these stops 92 and 93 are the secondary stops, corresponding to the secondary order of the system of classification. If, for instance, the "2" stop 92 has been projected, the tappet 96 will travel along the carrier 90 until it is arrested by this projected stop. It will then carry the carrier 90 with it, and this will by engagement of the tappet 97 with the wing 51 carry the carrier 40 with it to first project the carrier 40 and then raise a pair of chosen selectors S.

The selective manipulative means.

Referring to Figures 1, 2, 3, 4, 6, 9, 10 and 21, arranged vertically inside of and connecting the plates 4 and 8, is a plate 100, which is slotted to receive the shanks 101 of a series of keys p, s and t, the key shanks projecting also through slots in the front 2. There are in this embodiment three vertical rows of ten keys, each corresponding respectively as to rows to the primary, secondary and tertiary orders, and corresponding as to the keys in each row, to the digits in these respective orders. The end of each key shank is forked as shown at 102, while each shank is provided with a spring 103 coiled on a projection 104 on the shank and bearing against the plate 100, the spring holding the key projected, the extent of the projection being limited by a lug 105 engaging the front 2.

Each vertical row of key shanks is embraced by a latch plate 106 guided for vertical movement in brackets 107 and normally retained in depressed position by a spring 108. The lug 105 is formed to provide a cam arranged to engage the end of the slot in the plate 106, through which the key shank passes. Accordingly upon the depression of any key, the plate 106 will be raised until upon complete depression of the key, the plate will drop over the shoulder and lock the key in depressed position against the tension of its spring. Upon the depression of any other key in the same vertical row, however, the previously depressed key will be released while the last depressed key will be latched in position.

Each plate 106 is provided with a lug 109 and the lugs of all of the plates are straddled by a cross bar 110 fixed to the arms on a rock shaft 111, which rock shaft has a cam-shaped arm 112 in the path of a tappet 113 on the side 41 of the carrier 40. The arm 114 also fixed to the rock shaft 111 is connected to one end of a spring 115, which is anchored on the plate 8 in which the rock shaft is mounted. This spring 115 normally holds the cross bar 110 against the lugs 109 but this spring is considerably weaker than the spring 108 so as to not overcome the tension thereof.

When the carrier 40 moves forwardly the tappet 113 will pass over the cam-shaped end of the arm 112 and is allowed to snap thereover by the spring 115 yielding. When, however, this tappet again returns upon rearward movement of the carrier 40, it will by engagement with the arm 112, as shown in Figure 9, rock the shaft 111, thereby causing the cross bar 110 to move upwardly and, by engagement with the lug or lugs 109 on the plates 106, will raise the plates and release any key which has been depressed. Of course, after the plates 106 have been so raised to release all depressed keys, the tappet 113 will snap over the arm 112, and this arm and the plates are then allowed to return to normal positions.

The setting connections.

The keys are arranged to control the setting of the primary, secondary and tertiary locating means, comprising the stops and the selectors as heretofore described. Accordingly, the primary keys p are arranged to control the projection of the primary stops 84, the secondary keys s are arranged to control the projection of the secondary stops 92, and the tertiary keys t are arranged to control the selection and actuation of the selectors S and, therefore, control the locations with respect to the cards in a selected unit or division, in a selected group.

Primary setting means.

Referring to Figures 3, 4, 6, 8, 9, 12, 13, 18 and 21, arranged below the carrier 80 is a support 120, this support being fixed to the plate 8 by studs 810 so that its upper face will engage the upper face of the carrier, the carrier in fact sliding upon this support. The support 120 has a series of vertical channels or guide ways 121, which in the normal relative positions of the support and carrier are in alinement with the respective channels for the stops 84, it being understood that there are in this particular embodiment nine channels corresponding to the nine movable stops, the channel for the "9" stop 87 being, of course, omitted. Arranged in each channel or guide 121 is a ball 122 which rests upon a head 123, while upon this ball rests the head 86 of the stop 84, so that the plane of the contacting faces of the support and carrier will pass through the contacting faces of the balls and the heads 86.

Each guide 121 is connected by a tube 124 one end of the tube being screwed or otherwise secured in the support 120, while the other end of the tube is screwed or otherwise secured in a support 125 between the plates 4 and 8 and spaced a short distance from the plate 100. Arranged in the tube 124 is a flexible transmission member 126 comprising a helical spring having its turns in close contact so as to form a flexible but substantially inextensible element. The head 123 which also has a rounded face engaging the ball 122, is secured to one end of this element by a shank 127 taking into the element and firmly fixed thereto, while the other end of the element has a head 128 similarly secured therein and bearing against the shank of the primary key. It will, of course, be understood that there are a series of nine of these tubes and nine elements therein corresponding to the nine primary movable stops 84.

Upon depression of any primary key $p$ such for instance, as key "8", the movement will be transmitted through the flexible element 126 to the ball 122 so as to raise this ball and accordingly raise the primary stop 84 from full to dotted position, Figure 13, it being understood that the depression of the key is sufficient to cause the lower face of the ball to be raised above the contacting faces between the support 120 and the carrier 80; accordingly the ball will be projected into the carrier 80 and will be locked in that position by the locking of the key shank in the depressed position by the plate 106. As the tray is now pulled forwardly, the engagement of the tappet 72 with the elevated stop will move the carrier 80 forward, the ball now rolling on top of the support 120. In view of the spherical face of the ball, slight inaccuracies will be taken care of for even if the ball is not fully projected, it will, by the cam action of its spherical face roll out of the guide 121 any way on top of the face of the support 120. Moreover even if the ball is projected so that the head 123 will project slightly beyond the face of the support, the movement of the carrier is not impeded, because the spherical rounded face of the head 123 will cause this head to be depressed, the flexible element 126 yielding sufficiently for this purpose. Accordingly upon the depression of the primary key the corresponding primary stop will be projected and will then be retained in projected position. Upon return of the carrier 80, the parts will be restored as the ball will again drop into its guide 121. The spring retainer 88 mounted on the plate 8, follows the outward movement of the carrier 80, so as to retain the ball 122 of the "0" stop in its guide 121.

*Secondary setting means.*

Referring to Figures 3, 4, 6, 8, 9, 14, 15, 19 and 21, the connections for the secondary setting means are very similar to the connections for the primary setting means and accordingly the corresponding elements are indicated by corresponding reference characters.

Arranged below the carrier 90 is a support 130 which is fixed to the plate 8 by studs 811 so that its upper face is engaged by the lower face of the carrier 90, whereby the carrier will slide upon the support. This support is also provided with a series of nine channels or guides 121 having balls 122 therein engaging the heads 123 on the flexible elements 126, which are mounted in tubes 131 connecting the channels in the support 130 with the support 125, the other ends of the elements being provided with heads 128 engaged by the shanks of the secondary keys.

The operation is very similar to the operation of the primary setting mechanism and further detail description is, therefore, unnecessary. Upon the depression of any secondary key, the selected secondary stop, such as "2" will be elevated and retained elevated until the tray is again moved rearwardly, when the parts will return to their normal positions.

*Tertiary setting means.*

Referring to Figures 3, 4, 6, 8, 11, 16, 17, 20 and 21, the tertiary setting connections are in most respects similar to the primary and secondary connections and similar parts will, therefore, be indicated by similar reference characters. Each rock shaft 44 has fixed thereto an arm 140 provided with a laterally extending wing arranged to be engaged by a plunger 141 in a support 142 fixed to the plate 8, there being a series of ten of these arms 140 and plungers 141 corresponding to the ten rock shafts 44 and the ten pairs of selectors controlled thereby. The plunger 141 is encircled by a spring 143 arranged within the support, and has a head 144 provided with a shank 145 in the flexible element 126 arranged in a tube 146 connecting the support 142 with the support 125, the other end of the flexible element being provided with a head 128 engaging the shank of the tertiary key.

Upon depression of any selected tertiary key, such as the "5" key, the selected arm 140 will be raised to dotted position, Figure 17, thereby causing the lugs 62 of the arms on the corresponding rock shaft 44 to take in front of the hooks 61 on the corresponding selector extensions so as to operate the racks 58. As the carrier 40 now moves forward, the corresponding selectors will be raised to elevate the corresponding card, it being understood that the carrier is moved by engagement of the tappet 97 with the wing 51 on the bracket 50.

Résumé of operations.

Let us assume that it is desired to select card "825". In order to effect such selection, the auditor will successively depress primary key "8", secondary key "2" and tertiary key "5", these keys being latched in depressed positions. Upon depression of the primary key "8", the primary "8" stop 84 is projected beyond the carrier 80 and in the path of the tappet 72 on the tray. Upon depression of the secondary "2" key, the "2" secondary stop 92 is projected beyond the carrier 90 and in the path of the tappet 96 on the primary carrier 80. Upon the depression of the tertiary key "5", the "5" rock shaft 44 will be rocked so as to retain the corresponding pair of racks 58 interconnected with the "5" selectors S. This will set all of the mechanism for the selection of card "825".

As the tray is pulled forwardly by its handle 15, the tappet 72 connected with the tray will be carried with it along the top face of the primary carrier. When the tappet strikes against the "8" primary stop, the primary carrier will be carried with it and the tappet 96 on the primary carrier will now move over the secondary carrier 90. As the tappet 96 strikes the secondary stop "2", it will have finally positioned the "20" division of the "800" group in the tray in alinement with the row of selectors across the tray so that these selectors are now in a position to enter that compartment. As the tray continues to move outward, the tappet 97 on the secondary carrier engaging with the bracket on the selector carrier 40 will move this carrier forwardly as shown in Figures 2 and 9, this selector carrier moving with the tray for a limited movement until arrested by the stop 48, which arrests the tray as well, thereby placing the "20" division in the "800" division somewhat beyond the front of the cabinet. During this movement of the selector carrier with the tray, the "5" selectors will be raised, and by their cooperation with the characteristics on the "5" card in a located division or unit, will elevate that card to the full extent while the next succeeding card will be elevated partially, this being accomplished by the concurrent engagement of the "5" selectors with the supplemental characteristics of the next succeeding card. Accordingly, upon complete withdrawal of the tray, card "825" will be completely isolated from the remaining cards in the tray so that it can readily be withdrawn.

When the selected card, such as "825" has been withdrawn and it is desired to replace it, this can readily be accomplished by placing it immediately in front of card "826", which has been partially elevated. If the tray is now again pushed back into the cabinet, the first operation will be the dropping of the selectors, since the springs 45 will insure the immediate retraction of the selector carrier with the tray so as to immediately drop the selectors before the tray begins to move with respect to the selector carrier, the inward movement of the selector carrier being determined by engagement of this carrier with the stop 47. Upon final movement of the selector carrier, the engagement of the tappet 113 with the arm 112 will release all of the set keys through the connections heretofore described, thereby also releasing all of the flexible elements leading to the primary and secondary stops and to the tertiary selector rack retainers. As the tray moves back, the primary carrier 80 will move with it under the tension of the spring 83 connected to the primary stop carrier until this primary carrier is arrested by the engagement of the studs 81 with the ends of the slots 82, thereby returning the primary carrier to normal position. The engagement of the bracket 50 with the secondary stop carrier 90 will return this stop carrier to normal position. As the primary and secondary carriers are moved back to normal positions, the balls therein will snap into the guides or recesses in the respective primary and secondary supports 120 and 130. Accordingly, all parts are returned to normal positions for effecting another selection of any other desired card.

If an account has been withdrawn and the tray pushed back into the cabinet, the replacing of this account can readily be effected by simply setting up on the key board the number of this account and then withdrawing the tray from the cabinet. This will in the manner heretofore described, raise the next succeeding card partially, and accordingly the account can readily be replaced by placing it in front of this partially elevated card and then closing the tray.

It will be noted that, although there are a series of ten primary stops and a series of ten secondary stops, only nine stops in each series are movable and normally in retracted position, the tenth primary stop 87 and the tenth secondary stop 93 being fixed. It is unnecessary that all of the ten primary and ten secondary stops be movable, since one stop in each series can be fixed for the reason that these can correspond to normal positions, for instance, the nine hundred group and the ninety division; accordingly, these corresponding stops can be fixed thereby simplifying the construction. All of the selectors are, however, movable and accordingly, there are ten actuators and setting devices for these selectors, while the actuators and setting devices for the last primary and secondary stops are entirely omitted. Accordingly, while the "9" primary and secondary keys are really blind keys, the "9" tertiary key is an active key. Accordingly, in order to obtain card 999, it is only necessary to depress the 9 tertiary key; in order, however, to obtain card No. 9, it is necessary to depress "0"—"0"—"9".

As previously described, the tray is arranged for removal from the cabinet, and this can be accomplished by turning the knob 71, so as to move the tappet 72 out of the path of the primary stops. Moreover, this permits the selecting mechanism to be entirely thrown out of action. For instance, if it is desired to simply withdraw the tray for any purposes without effecting a selection, this can be accomplished by turning the knob 71 so as to throw the tappet 72 entirely out of action.

It will be noted that the provision of the movable carrier for the selectors, not only permits actuation of the selectors, but serves to place the isolated card a considerable distance in front of the front of the cabinet. Accordingly, the desired card is not only isolated when completely actuated, but is also placed in such a position that it can be readily withdrawn and replaced.

It is obvious that various changes may be made in the details of construction without departing from the spirit of this invention; it is, therefore, to be understood that this invention is not to be limited to the specific details shown and described.

Having thus described the invention, what is claimed is:

1. An apparatus of the character described, comprising, a cabinet, a card tray mounted for movement into and out of said cabinet, and means adapted to effect selection of cards in said tray when moved out of said cabinet.

2. An apparatus of the character described, comprising, a cabinet, a card tray mounted for movement thereon, and means adapted to successively effect selection of a group of cards in said tray and of a division of such group when said tray is moved out of said cabinet.

3. An apparatus of the character described, comprising, a cabinet, a card tray mounted for movement into and out of said cabinet, and means adapted to successively effect selection of a group of cards in said tray, of a division of such group and of a card of such division when said tray is moved out of said cabinet.

4. An apparatus of the character described, comprising, a cabinet, a card tray mounted for movement into and out of said cabinet, and means adapted to successively effect selection of a unit of cards in said tray and of a card in such unit when said tray is moved out of said cabinet.

5. An apparatus of the character described, comprising, a cabinet, a card tray mounted for movement into and out of said cabinet, and means adapted to effect selection of a single card from among the cards in said tray when moved out of said cabinet.

6. An apparatus of the character described, comprising, a cabinet, a card tray mounted for movement into and out of said cabinet, means adapted to effect selection of cards in said tray when moved out of said cabinet, and selective manipulative means adapted to control said selecting means.

7. An apparatus of the character described, comprising, a cabinet, a card tray mounted for movement into and out of said cabinet, card selecting means, and means for effecting location of said selecting means with respect to the cards in said tray when moved out of said cabinet.

8. An apparatus of the character described, comprising, a cabinet, a card tray mounted for movement into and out of said cabinet, card selecting means, and means for effecting primary and secondary locations of said selecting means with respect to the cards in said tray when moved out of said cabinet.

9. An apparatus of the character described, comprising, a cabinet, a card tray mounted for movement into and out of said cabinet, card selecting means, means for effecting primary and secondary locations of said selecting means with respect to the cards in said tray when moved out of said cabinet, and means for effecting tertiary location of said selecting means with respect to the cards.

10. An apparatus of the character described, comprising, a cabinet, a card tray mounted for movement into and out of said cabinet, card selecting means, and selective manipulative means for effecting location of said selecting means with respect to the cards in said tray when moved out of said cabinet.

11. An apparatus of the character described, comprising, a support, a card tray mounted for movement thereon, and means operating upon movement of said tray adapted to effect selection of cards in said tray.

12. An apparatus of the character described, comprising, a support, a card tray mounted for movement thereon, and selective manipulative means operating upon movement of said tray to effect selection of cards in said tray.

13. An apparatus of the character described, comprising, a support, a card tray mounted for movement thereon, and means, operating upon movement of said tray, adapted to successively effect selection of a group of cards in said tray and of a division of such group.

14. An apparatus of the character described, comprising, a support, a card tray mounted for movement thereon, and means, operating upon movement of said tray, adapted to successively effect selection of a group of cards in said tray, of a division of such group, and of a card of such division.

15. An apparatus of the character described, comprising, a support, a card tray mounted for movement thereon, and means, operating upon movement of said tray, adapted to successively effect selection of a unit of cards in said tray and of a card of such unit.

16. An apparatus of the character described, comprising, a support, a card tray mounted for movement thereon, card selecting means, and means operating upon movement of said tray adapted to effect location of said selecting means with respect to the cards in said tray.

17. An apparatus of the character described, comprising, a support, a card tray mounted for movement thereon, card selecting means, and means operating upon movement of said tray adapted to effect location of said selecting means with respect to a group of the cards in said tray and with respect to a division of such group.

18. An apparatus of the character described, comprising, a support, a card tray mounted for movement thereon, card selecting means, means operating upon movement of said tray adapted to effect location of said selecting means with respect to a group of the cards in said tray and with respect to a division of such group, and means adapted to effect location of said selecting means with respect to a card of such division.

19. An apparatus of the character described, comprising, a support, a card tray mounted for movement thereon, card selecting means, and means operating upon movement of said tray adapted to effect location of said selecting means with respect to a unit of the cards in said tray.

20. An apparatus of the character described, comprising, a support, a card tray mounted for movement thereon, card selecting means, means operating upon movement of said tray adapted to effect location of said selecting means with respect to a unit of the cards in said tray, and means adapted to effect location of said selecting means with respect to a card of such unit.

21. An apparatus of the character described, comprising, a support, a card tray mounted for movement thereon, means adapted to effect selection of a group of cards in said tray, and means adapted upon movement of said tray to isolate a selected card.

22. An apparatus of the character described, comprising, a support, a card tray mounted for movement thereon, card selecting means, means for effecting location of said selecting means with respect to the cards in said tray, and means adapted upon movement of said tray to isolate a selected card.

23. An apparatus of the character described, comprising, a support, a card tray mounted for movement thereon, means operating upon movement of said tray adapted to effect selection of a group of cards in said tray, and means adapted to isolate a selected card.

24. An apparatus of the character described, comprising, a support, a card tray mounted for movement thereon, card selecting means, means operating upon movement of said tray adapted to effect location of said selecting means with respect to the cards in said tray, and means adapted to isolate a selected card.

25. An apparatus of the character described, comprising, a support, a card tray mounted for movement thereon, card selectors adapted for operation upon movement of said tray, and means for setting said selectors for such operation.

26. An apparatus of the character described, comprising, a support, a card tray mounted for movement thereon, card selectors adapted for operation upon movement of said tray, and selective manipulative means for setting said selectors for such operation.

27. An apparatus of the character described, comprising, a support, a card tray mounted for movement thereon, card selecting means, means for setting said selecting means, and means operating upon movement of said tray adapted to effect selection of a card in said tray.

28. An apparatus of the character described, comprising, a support, a card tray mounted for movement thereon, card selecting means, means for setting said selecting means, and means operated upon movement of said tray adapted to effect location of said selecting means with respect to said tray.

29. An apparatus of the character described, comprising, a support, a card tray mounted for movement thereon, card selecting means, means for setting said selecting means, and means operating upon movement of said tray adapted to effect location of said selecting means longitudinally of said tray.

30. An apparatus of the character described, comprising, a support, a card tray mounted for movement thereon, card selecting means, means for setting said selecting means, means operated upon movement of said tray adapted to effect location of said selecting means longitudinally of said tray, and means adapted to effect location of said selecting means transversely of said tray.

31. An apparatus of the character described, comprising, card selecting means, and a card tray mounted for movement with respect to said selecting means.

32. An apparatus of the character described, comprising, card selecting means, and a card tray mounted for movement in the direction along its length with respect to said selecting means.

33. An apparatus of the character described, comprising, card selecting means, a card tray mounted for movement with respect to said selecting means, and means for limiting said movement to locate said tray with respect to said selecting means.

34. An apparatus of the character described, comprising, card selecting means, a card tray mounted for movement with respect to said selecting means, said tray having cards provided with tabs, and means for locating said tray with the tab of a desired card therein in cooperative relation with respect to said selecting means.

35. An apparatus of the character described, comprising, card selecting means, a card tray mounted for movement with respect to said selecting means, and means for locating said tray with a selected unit of cards therein in cooperative relation with respect to said selecting means.

36. An apparatus of the character described, comprising card selecting means, a card tray mounted for movement with respect to said selecting means, said tray having cards provided with tabs and means for locating said tray with the tabs of a desired card of a selected unit of cards in said tray in cooperative relation with respect to said selecting means.

37. An apparatus of the character described, comprising, card selecting means, a card tray mounted for movement with respect to said selecting means, and means for locating said tray with a selected division of a selected group of cards in said tray in cooperative relation with respect to said selecting means.

38. An apparatus of the character described comprising card selecting means, a card tray mounted for movement with respect to said selecting means, said tray having cards provided with tabs, and means for locating said tray with the tabs of a desired unit of cards in said tray in cooperative relation with respect to said selecting means.

39. An apparatus of the character described, comprising, card selecting means, a card tray mounted for movement with respect to said selecting means in order to locate the cards in said tray with respect to said selecting means, and means for adjusting said selecting means to cooperate with the cards.

40. An apparatus of the character described, comprising, card selecting means, a card tray mounted for movement with respect to said selecting means, means for setting said selecting means to cooperate with the cards, and means for limiting said tray movement for locating said tray with respect to said selecting means.

41. An apparatus of the character described, comprising, card selecting means, a card tray mounted for movement with respect to said selecting means, and means operating upon movement of said tray adapted to isolate a selected card.

42. An apparatus of the character described, comprising, card selecting means, a card tray mounted for movement with respect to said selecting means, means for locating said tray, and means operating upon location of said tray adapted to isolate a selected card.

43. An apparatus of the character described, comprising, card selecting means, a card tray mounted for movement with respect to said selecting means, means for setting said selecting means, and means operating upon movement of said tray adapted to isolate a selected card.

44. An apparatus of the character described, comprising, card selecting means, a card tray mounted for movement with respect to said selecting means, means for setting said selecting means, means for limiting the movement of said tray to locate the same, and means operating upon location of said tray adapted to isolate a selected card.

45. An apparatus of the character described, comprising, card selecting means, a card tray mounted for movement with respect to said selecting means, and means for effecting location of said tray in accordance with a given system.

46. An apparatus of the character described, comprising, card selecting means, a card tray mounted for movement with respect to said selecting means, and means for effecting location of said tray in accordance with the successive orders of a given system.

47. An apparatus of the character described, comprising, card selecting means, a card tray mounted for movement with respect to said selecting means, means for setting said selecting means, and means for effecting location of said tray in accordance with a given system.

48. An apparatus of the character described, comprising, card selecting means, a card tray mounted for movement with respect to said selecting means, and means for effecting primary and secondary locations of said tray.

49. An apparatus of the character described, comprising, card selecting means, a card tray mounted for movement with respect to said selecting means, and means for effecting primary and secondary locations of said tray and final selection of a card.

50. An apparatus of the character described, comprising, selecting means, a card tray, and means for effecting successive relative locating movements of said tray and said selecting means along the tray.

51. An apparatus of the character described, comprising, selecting means, a card tray, means for effecting successive relative locating movements of said tray and said selecting means along the tray, and means for effecting relative locating movements of said tray and said selecting means transversely of said tray.

52. An apparatus of the character described, comprising, a cabinet, a tray mounted for movement therein, and means operating upon withdrawal of said tray adapted to effect selection of a card in said tray.

53. An apparatus of the character described, comprising, a cabinet, a tray mounted for movement therein, and means adapted to select a card when the tray is withdrawn from the cabinet.

54. An apparatus of the character described, comprising, a cabinet, a tray mounted for movement therein, and means adapted to select a desired card when the tray is withdrawn to expose such card.

55. An apparatus of the character described, comprising, a cabinet, a tray mounted for movement therein, and means operating upon withdrawal of the tray adapted to select a desired card when exposed.

56. An apparatus of the character described, comprising, a cabinet, a tray mounted for movement therein, and means adapted to select and raise a desired card above the remaining cards when the tray is withdrawn to an extent sufficient to expose such card beyond the cabinet.

57. An apparatus of the character described, comprising, a cabinet, a tray mounted for movement therein, and selecting means on said cabinet adapted to select cards in said tray.

58. An apparatus of the character described, comprising, a cabinet, a tray mounted for movement therein, selecting means on said cabinet adapted to select cards in said tray, and means for setting said selecting means.

59. An apparatus of the character described, comprising, a cabinet, a tray mounted for movement therein, and selecting means on said cabinet and arranged below said tray adapted to select cards in said tray.

60. An apparatus of the character described, comprising, a cabinet, a tray mounted for movement therein, selecting means on said cabinet adapted to select cards in said tray, and means for locating said tray with respect to said selecting means.

61. An apparatus of the character described, comprising, a cabinet, a tray mounted for movement therein, selecting means on said cabinet adapted to select cards in said tray, means for locating said tray with respect to said selecting means, and selective manipulative means for said locating means.

62. An apparatus of the character described, comprising, a support, a card tray mounted for movement thereon, and means for selectively locating said tray.

63. An apparatus of the character described, comprising, a support, a card tray mounted for movement thereon, and primary and secondary means for selectively locating said tray.

64. An apparatus of the character described, comprising, a support, a card tray mounted for movement thereon, means for locating said tray, and selective manipulative means for said locating means.

65. An apparatus of the character described, comprising, a support, a card tray mounted for movement thereon, and a series of selective locating elements for said tray.

66. An apparatus of the character described, comprising, a support, a card tray mounted for movement thereon, a series of tray-locating elements, and selective manipulative means for said elements.

67. An apparatus of the character described, comprising, a support, a card tray mounted for movement thereon, means for primarily locating said tray, and means for secondarily locating said tray.

68. An apparatus of the character described, comprising, a support, a card tray mounted for movement thereon, means for primarily locating said tray, means for secondarily locating said tray, and selective manipulative means for said locating means.

69. An apparatus of the character described, comprising, a support, a card tray mounted for movement thereon, and primary and secondary tray-locating elements.

70. An apparatus of the character described, comprising, a support, a card tray mounted for movement thereon, a series of primary tray-locating elements, and a series of secondary tray locating elements.

71. An apparatus of the character described, comprising, a support, a card tray mounted for movement thereon, primary and secondary tray-locating elements, and selective manipulative means for said elements.

72. An apparatus of the character described, comprising, a support, a card tray mounted for movement thereon, a series of primary tray-locating elements, a series of secondary tray locating elements, and selective manipulative means for said respective primary and secondary elements.

73. An apparatus of the character described, comprising, a support, a card tray mounted for movement thereon, selecting means on said support, and means for selectively locating said tray on said support.

74. An apparatus of the character described, comprising, a support, a card tray mounted for movement thereon, selecting means on said support, means for selectively locating said tray on said support, and selective manipulative means for said locating means.

75. An apparatus of the character described, comprising, a support, a card tray mounted for movement thereon, selecting means on said support, means for selectively locating said tray on said support, and selective manipulative means for said locating means and for said selecting means.

76. An apparatus of the character described, comprising, a support, a card tray mounted for movement thereon, selecting means on said support, means for selectively locating said tray on said support, and means for locating said selecting means.

77. An apparatus of the character described, comprising, a support, a card tray mounted for movement thereon, selecting means on said support, and means for primarily and secondarily locating said tray.

78. An apparatus of the character described, comprising, a support, a card tray mounted for movement thereon, selecting means on said support, means for primarily and secondarily locating said tray, and means for tertiarily locating said selecting means.

79. An apparatus of the character described, comprising, a support, a card tray mounted for movement thereon, selecting means on said support, means for primarily and secondarily locating said tray, and selective manipulative means for said locating means.

80. An apparatus of the character described, comprising, a support, a card tray mounted for movement thereon, selecting means on said support, means for primarily and secondarily locating said tray, means for tertiarily locating said selecting means, and selective manipulative means for said locating means.

81. In an apparatus of the character described, a primary carrier, a series of stops thereon, a secondary carrier, and a series of stops thereon for said primary carrier.

82. In an apparatus of the character described, a primary carrier, a series of stops thereon, a secondary carrier, a series of stops thereon for said primary carrier, primary means for selectively projecting said primary stops, and secondary means for selectively projecting said secondary stops.

83. In an apparatus of the character described, a support, a primary carrier thereon, a series of stops on said carrier, a secondary carrier on said support, and a series of stops on said secondary carrier for said primary carrier.

84. In an apparatus of the character described, a support, a primary carrier thereon, a series of stops on said carrier, a secondary carrier on said support, a series of stops on said secondary carrier for said primary carrier, and means for selectively projecting said stops.

85. In an apparatus of the character described, a movable carrier, a series of selectors thereon, and actuating means adapted upon movement of said carrier to shift said selectors.

86. In an apparatus of the character described, a movable carrier, a series of selectors thereon, normally ineffective actuating means adapted upon movement of said carrier to shift said selectors, and means for rendering effective said actuating means for one of said selectors.

87. In an apparatus of the character described, a movable carrier, a series of selectors thereon, actuating means adapted upon movement of said carrier to shift said selectors, and selective manipulative means for controlling said actuating means.

88. In an apparatus of the character described, a movable carrier, a series of selectors thereon, normally ineffective actuating means adapted upon movement of said carrier to shift said selectors, and selective manipulative means for rendering effective said actuating means for one of said selectors.

89. An apparatus of the character described, comprising, a cabinet, selecting means thereon, a card tray removably mounted in said cabinet, and means for causing said selecting means to select a card in said tray.

90. An apparatus of the character described, comprising, a cabinet, selecting means thereon, a card tray movably mounted in said cabinet, means for locating the cards and said tray with respect to said selecting means, and means on said tray adapted for cooperation with a component of said selecting means in order to select a card.

91. An apparatus of the character described, comprising, a cabinet, selecting means on the cabinet, a card tray movably mounted in said cabinet, means for locating the cards and said tray with respect to said selecting means, means on said tray adapted for cooperation with said selecting means in order to select a card and adapted to be manually released to permit removal of said tray from said cabinet.

In testimony whereof we affix our signatures this 16th day of March, 1920.

LUTHER A. WATTERS.
EDWIN L. RELLER.

cooperation with a component of said selecting means in order to select a card.

91. An apparatus of the character described, comprising, a cabinet, selecting means on the cabinet, a card tray movably mounted in said cabinet, means for locating the cards and said tray with respect to said selecting means, means on said tray adapted for cooperation with said selecting means in order to select a card and adapted to be manually released to permit removal of said tray from said cabinet.

In testimony whereof we affix our signatures this 16th day of March, 1920.

LUTHER A. WATTERS.
EDWIN L. RELLER.

CERTIFICATE OF CORRECTION.

Patent No. 1,658,363.  Granted February 7, 1928, to

LUTHER A. WATTERS ET AL.

It is hereby certified that error appears in the printed specification of the above numbered patent requiring correction as follows: Page 8, line 58, claim 2, strike out the word "thereon" and insert the words "into and out of said cabinet"; and that the said Letters Patent should be read with this correction therein that the same may conform to the record of the case in the Patent Office.

Signed and sealed this 20th day of March, A. D. 1928.

Seal

M. J. Moore,
Acting Commissioner of Patents.

CERTIFICATE OF CORRECTION.

Patent No. 1,658,363.                                                         Granted February 7, 1928, to

LUTHER A. WATTERS ET AL.

It is hereby certified that error appears in the printed specification of the above numbered patent requiring correction as follows: Page 8, line 58, claim 2, strike out the word "thereon" and insert the words "into and out of said cabinet"; and that the said Letters Patent should be read with this correction therein that the same may conform to the record of the case in the Patent Office.

Signed and sealed this 20th day of March, A. D. 1928.

Seal                                                               M. J. Moore,
                                                                  Acting Commissioner of Patents.